US012738222B2

(12) United States Patent
Wang et al.

(10) Patent No.: US 12,738,222 B2
(45) Date of Patent: Sep. 15, 2026

(54) DISPLAY DEVICE

(71) Applicant: Novatek Microelectronics Corp., Hsinchu (TW)

(72) Inventors: Hung-I Wang, Hsinchu City (TW); Hui-Feng Lin, Taichung City (TW); Yen-Tao Liao, Hsinchu City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 19/090,380

(22) Filed: Mar. 25, 2025

(65) Prior Publication Data

US 2026/0188215 A1 Jul. 2, 2026

(30) Foreign Application Priority Data

Dec. 30, 2024 (TW) ................................ 113151488

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2320/0247* (2013.01); *G09G 2320/064* (2013.01); *G09G 2340/0435* (2013.01)

(58) Field of Classification Search
None
See application file for complete search history.

(56) References Cited

U.S. PATENT DOCUMENTS

| | | | | |
|---|---|---|---|---|
| 8,022,904 B2 | 9/2011 | Yamashita et al. | |
| 2009/0085844 A1 | 4/2009 | Yamashita et al. | |
| 2020/0082768 A1* | 3/2020 | Oh | G09G 3/3291 |
| 2024/0105119 A1* | 3/2024 | Liu | G09G 3/3233 |
| 2024/0221684 A1 | 7/2024 | Choi et al. | |
| 2024/0331645 A1 | 10/2024 | Kim et al. | |

FOREIGN PATENT DOCUMENTS

| | | |
|---|---|---|
| TW | 200929136 A | 7/2009 |
| TW | 202441479 A | 10/2024 |

OTHER PUBLICATIONS

"Office Action of Taiwan counterpart Application", issued on Nov. 7, 2025, p. 1-p. 6.

* cited by examiner

*Primary Examiner* — Ifedayo B Iluyomade
(74) *Attorney, Agent, or Firm* — JCIPRNET

(57) ABSTRACT

A display device includes a display panel and a control circuit. The display panel includes a plurality of pixel driving circuits. Each pixel driving circuit includes a light emitting element and a switching element. The switching element controls a driving current flowing through the light emitting element. The control circuit is coupled to the display panel. The control circuit provides a control signal for controlling the switching element. The control signal includes multiple pulses during each frame period. The control circuit adjusts a width ratio of a first level and a second level of the pulses according to at least one of the refresh rate and the brightness of the display panel.

20 Claims, 6 Drawing Sheets

DISPLAY DEVICE

CROSS-REFERENCE TO RELATED APPLICATION

This application claims the priority benefit of Taiwan application serial no. 113151488, filed on Dec. 30, 2024. The entirety of the above-mentioned patent application is hereby incorporated by reference herein and made a part of this specification.

BACKGROUND

Technical Field

The disclosure relates to an electronic device, and in particular to a display device.

Description of Related Art

With the development of display technology, display panels have been widely used in various electronic devices. In some application scenarios, the display panel may be designed to have an operating mode with a variable refresh rate (VRR), so that the electronic device can save power and provide good display quality. However, if the frequency of the display panel changes arbitrarily, it may cause the control signal used to control the light emitting element to be interrupted at an unexpected time point. Failure to provide effective compensation for this phenomenon results in significant changes in panel display brightness and reduced display quality.

SUMMARY

The disclosure provides a display device that can reduce the flicker of a panel and provide good display quality.

The display device in an embodiment of the disclosure includes a display panel and a control circuit. The display panel includes multiple pixel driving circuits. Each pixel driving circuit includes a light emitting element and a switching element. The switching element controls a driving current flowing through the light emitting element. The control circuit is coupled to the display panel. The control circuit provides a control signal for controlling the switching element. The control signal includes multiple pulses during each frame period. The control circuit adjusts a width ratio of a first level and a second level of the pulses according to at least one of the refresh rate and the brightness of the display panel.

In order to make the above-mentioned features and advantages of the disclosure more comprehensible, embodiments are given below and described in detail with reference to the accompanying drawings.

DESCRIPTION OF THE EMBODIMENTS

Figure 1:
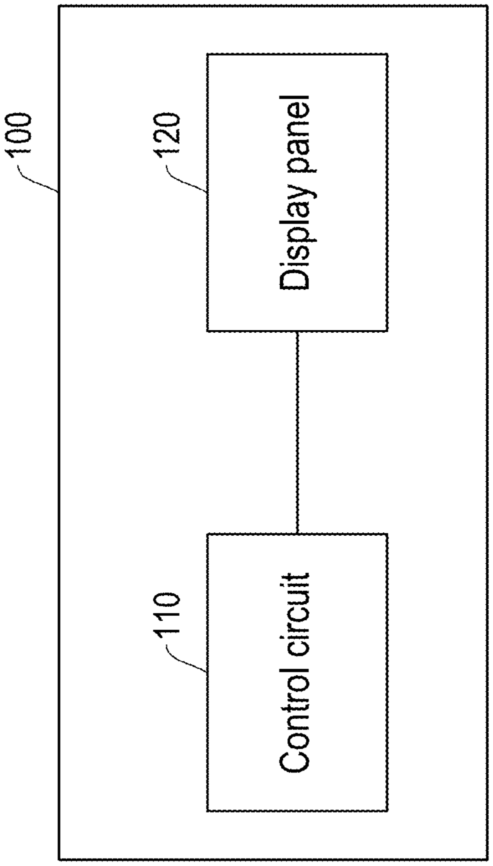
FIG. 1 is a schematic block diagram of a display device according to an embodiment of the disclosure.

The term "coupling (or connecting)" mentioned throughout the specification (including the appended claims) may refer to any direct or indirect means of connection. For example, when it is described in the text that a first device is coupled (or connected) to a second device, it should be interpreted that the first device may be directly connected to the second device, or the first device may be indirectly connected to the second device via another device or some other means of connection. The terms "first," "second," and similar terms mentioned throughout the specification (including the appended claims) are used to name elements or distinguish different embodiments or scopes, and are not intended to limit the number of elements in any way or restrict the order of the elements. Furthermore, wherever possible, elements/components/steps with the same reference numerals in the drawings and embodiments represent the same or similar parts. For elements/components/steps with the same reference numerals or the same terminology in different embodiments, reference may be made to each other for relevant descriptions.

Figure 2:
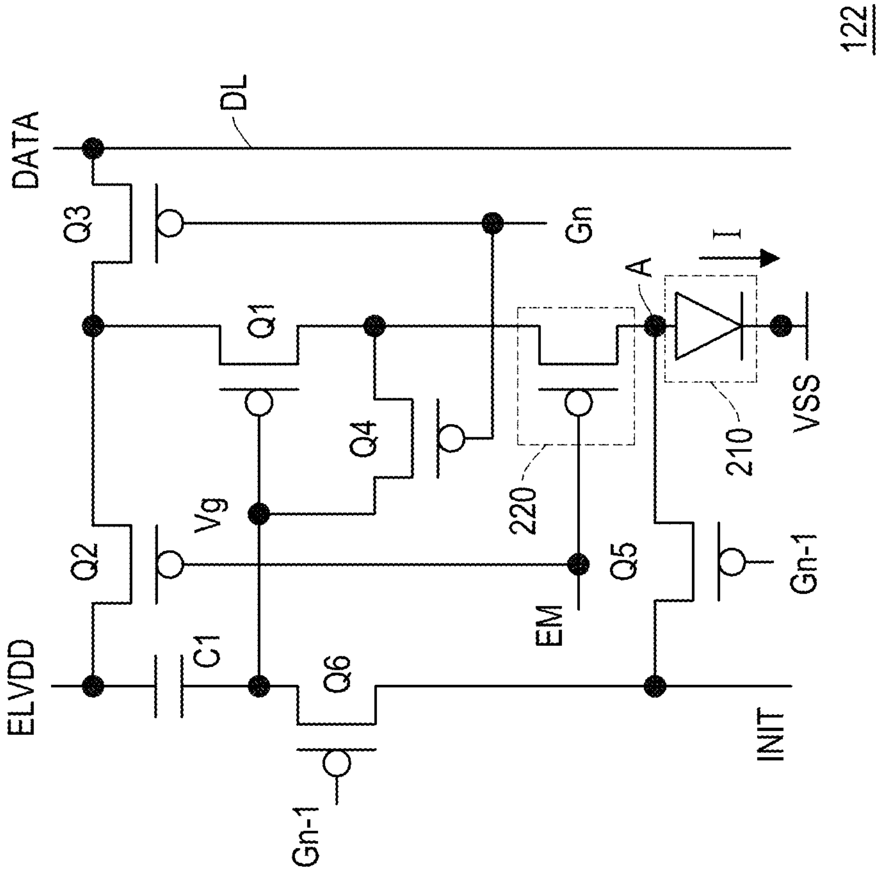
FIG. 2 is a schematic structural diagram of a pixel driving circuit included in a display panel of the embodiment of FIG. 1.

FIG. 1 is a schematic block diagram of a display device according to an embodiment of the disclosure. FIG. 2 is a schematic structural diagram of a pixel driving circuit included in a display panel of the embodiment of FIG. 1. Referring to FIG. 1 and FIG. 2, a display device 100 includes a control circuit 110 and a display panel 120. The control circuit 110 is coupled to the display panel 120. The display panel 120 includes a plurality of pixel driving circuits 122. The circuit structure of the pixel driving circuit 122 shown in FIG. 2 is merely used for illustration and is not intended to limit the disclosure.

In this embodiment, the display panel 120 is, for example, an adaptive refresh panel (ARP), which can retain images for a long time. The display device 100 with an ARP panel can operate in a variable refresh rate (VRR) mode to achieve power saving effects. In addition, the control circuit 110, for example, controls the display panel 120 using a long V timing mechanism to perform the display function.

In this embodiment, a processor may be used as an example of the control circuit 110. However, in different types of electronic devices, the control circuit 110 may be other hardware components with computing functions and driving functions.

In another embodiment, the control circuit 110 may be designed using a hardware description language (HDL) or any other digital circuit design method familiar to persons skilled in the art, and may be hardware circuits implemented by field programmable gate array (FPGA), complex programmable logic device (CPLD), or application-specific integrated circuit (ASIC). In addition, sufficient teachings, suggestions, and implementation instructions on the hardware structure of the control circuit 110 may be obtained by referring to common knowledge in the field.

In FIG. 2, the pixel driving circuit 122 includes a light emitting element 210 and a switching element 220. The switching element 220 is used to control a driving current I flowing through the light emitting element 210. The switching element 220 and the light emitting element 210 are coupled in series between a first voltage ELVDD and a second voltage VSS, where the first voltage ELVDD is greater than the second voltage VSS. The first terminal of the switching element 220 is coupled to the first voltage ELVDD through transistors Q1 and Q2, and is coupled to a data line DL through transistors Q1 and Q3. The pixel driving circuit 122 may receive a data voltage DATA through the data line DL. The second terminal of the switching element 220 is coupled to the first terminal of the light emitting element 210. The control terminal of the switching element 220 is coupled to the control signal EM. The control signal EM is used to control the conduction state of the transistor Q1 and the switching element 220.

The first terminal of the light emitting element 210 is coupled to the switching element 220, and the second terminal is coupled to the second voltage VSS. In this embodiment, the display panel 120 may be a self-emissive display panel, such as an organic light emitting diode (OLED) display panel. Therefore, the light emitting element 210 is an OLED, in which the first terminal is the anode terminal, and the second terminal is the cathode terminal. In other embodiments, the display panel 120 may also be a display panel including micro light emitting diodes (micro LED) or sub-millimeter light emitting diodes (mini LED). The disclosure does not limit the type of display panel.

On the other hand, transistors Q5 and Q6 are coupled to an (n−1)-th scan line, and a first scanning signal Gn−1 is applied to the (n−1)-th scan line to control the conduction state of the transistors Q5 and Q6, where n is a positive integer greater than 2. The transistors Q3 and Q4 are coupled to an n-th scan line, and the second scanning signal Gn is applied to the n-th scan line to control the switching element 220 of the transistors Q3 and Q4.

When the transistors Q5 and Q6 are turned on, a compensation signal INIT resets the voltage of a node A (the first terminal of the light emitting element 210) and the terminal voltage of a capacitor C1, so that every time the driving current I flows through the light emitting element 210, the node A may be maintained at the same voltage level. Then, when the transistors Q3 and Q4 are turned on, the data voltage DATA and a gate voltage Vg of the transistor Q1 form a voltage difference at the upper and lower ends of the transistor Q1, so that the driving current I is generated corresponding to the data voltage DATA. Therefore, when the switching element 220 is turned on, the driving current I may flow through the light emitting element 210, driving the light emitting element 210 to emit light.

In FIG. 2, the transistor Q2 and the switching element 220 are implemented using P-type metal-oxide-semiconductor (PMOS). Therefore, the low level control signal EM may be used to turn on the transistor Q2 and the switching element 220, and the high level control signal EM may turn off the transistor Q2 and the switching element 220. However, the disclosure is not limited thereto. In other embodiments, the transistor Q2 and the switching element 220 may also be implemented using N-type metal-oxide-semiconductor (NMOS). In this implementation, the high level control signal EM may be used to turn on the transistor Q2 and the switching element 220, and the low level control signal EM may turn off the transistor Q2 and the switching element 220.

The control circuit 110 is used to provide the control signal EM and the compensation signal INIT. The control signal EM is used to control the conduction state of the switching element 220. The compensation signal INIT is used to reset the node A. When the display device 100 operates in a VRR mode, the control circuit 110 may adjust the ratio of the pulse width of the control signal EM according to the refresh rate of the display panel 120 to reduce the flicker of the display panel 120 when the frequency changes instantaneously.

Figure 3:
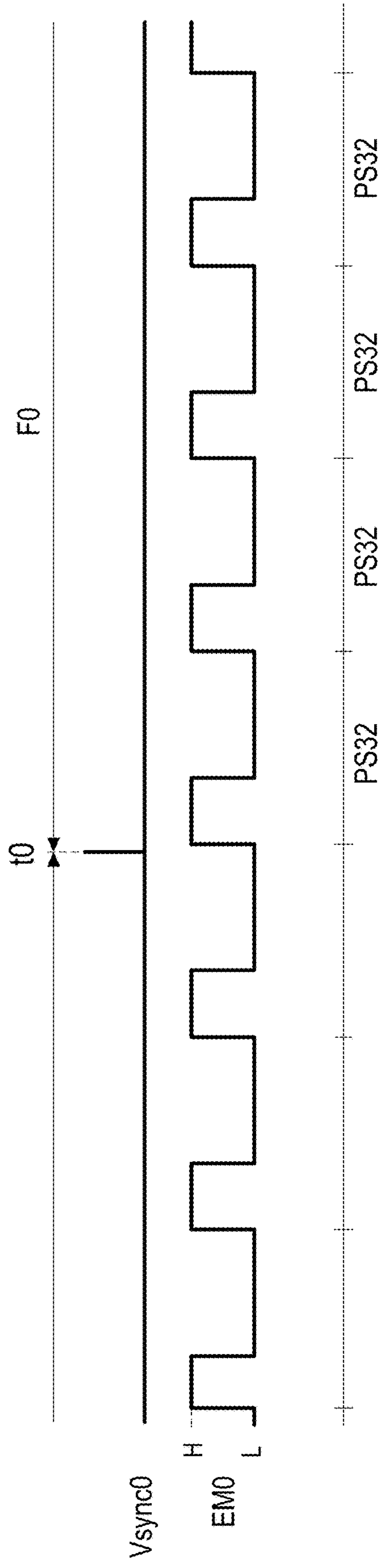
FIG. 3 is a schematic waveform diagram of a control signal according to a related example of the disclosure.
Figure 4:
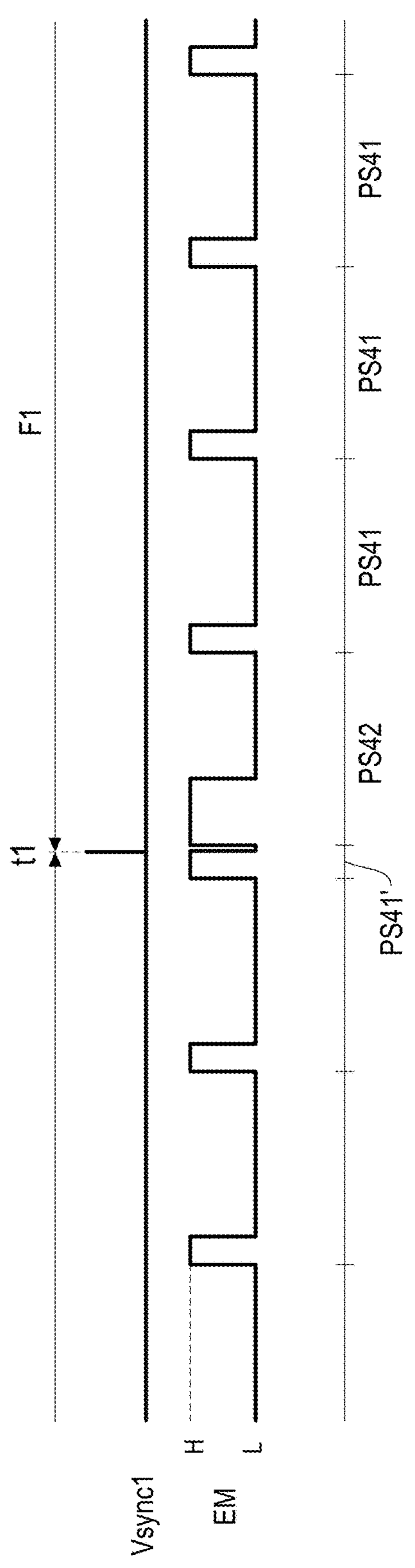
FIG. 4 is a schematic waveform diagram of a control signal according to an embodiment of the disclosure.

Specifically, FIG. 3 is a schematic waveform diagram of a control signal EMO according to a related example of the disclosure. FIG. 4 is a schematic waveform diagram of the control signal EM according to an embodiment of the disclosure. Please refer to FIG. 2 to FIG. 4. In FIG. 3 and FIG. 4, time points t0 and t1 at which the pulses of vertical sync signals Vsync0 and Vsync1 are high are the start time of each frame. In FIG. 3, the control signal EMO has a width of a pulse PS32 that remains constant during each frame period F0 and does not change with variations in the refresh rate.

In FIG. 4, the control circuit 110 may adjust the ratio of the pulse width of the control signal EM according to the refresh rate of the display panel 120, and apply the control signal EM to the transistor Q2 and the switching element 220 of FIG. 2. In detail, the control signal EM includes multiple pulses PS41 (first pulse) and PS42 (second pulse) during each frame period. The pulse PS42 is the first pulse of one frame period F1 of the control signal EM. The pulses PS1 are multiple pulses that are consecutively arranged after the pulse PS42 within the same frame period F1.

The control circuit 110 may adjust the width ratio of a high level H (a first level) and a low level L (a second level) of the pulse. In an embodiment, as the refresh rate of the display panel 120 becomes higher, the control circuit 110 adjusts the low level width of the pulse to be greater. In another embodiment, when the refresh rate of the display panel 120 changes, the control circuit 110 adjusts the low level width of the pulse. Therefore, the high level H and the low level L width ratios change adaptively. For example, before the refresh rate changes, the level width ratio of the pulse PS41 is the same as the pulse PS42. As the refresh rate of the display panel 120 becomes higher, the control circuit 110 increases the low level width of the pulse PS41 to make the width greater than the low level width of the pulse PS42, and reduce the high level width of the pulse PS41 to make the width smaller than the high level width of the pulse PS42, in which the total widths of the pulse PS41 and the pulse PS42 are the same.

Therefore, in this embodiment, the low level width of the pulse PS41 is greater than the high level width of the pulse PS41. The low level width of the pulse PS42 is also greater than the high level width of the pulse PS42. The low level width of the pulse PS41 is greater than the low level width of the pulse PS42, and the high level width of the pulse PS41 is smaller than the high level width of the pulse PS42.

In this embodiment, except that the level width ratio of the first pulse PS42 in each frame period remains unchanged, the low level width of the remaining pulses PS41 is increased and the high level width is decreased. When the frequency changes at the time point t1, taking the high level of the pulse PS42 and PS41' in FIG. 4 as an example, it may be regarded as the pulse high level being interrupted due to the frequency change, that is, if a portion of the low level of the pulse PS41' is not output before the frame period ends, then it means that the brightness of the light emitting element corresponding to the pulse PS41' is different from other light emitting elements. Since the portion of the pulse PS41' that is not fully output is at a low level, it means that the light emitting time is reduced. This situation does not impact significantly on the flicker of the panel. Therefore, the control circuit 110 increases the low level width of the pulse PS41 and decreases the high level width to reduce the flicker of the display panel 120 when the frequency changes instantaneously. The above-mentioned adjustment method of pulse width is merely an example and is not intended to limit the disclosure.

Figure 5:
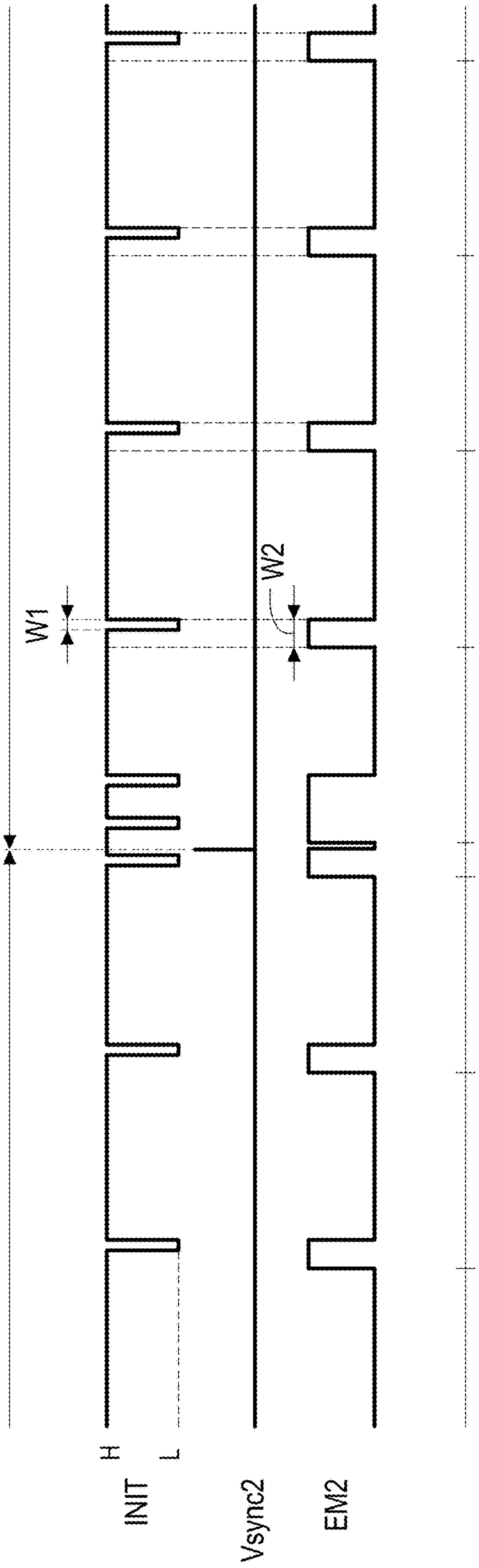
FIG. 5 is a schematic waveform diagram of the control signal and a compensation signal according to an embodiment of the disclosure.

FIG. 5 is a schematic waveform diagram of a control signal EM2 and the compensation signal INIT according to an embodiment of the disclosure. Please refer to FIG. 5, which further shows the waveform of the compensation signal INIT. In this embodiment, in conjunction with the adjustment of the level width ratio of the control signal EM2, the control circuit 110 further provides the compensation signal INIT to the first terminal of the light emitting element 220 to reset the voltage of the node A. Therefore, every time the driving current I flows through the light emitting element 210, the node A may be maintained at the same voltage level.

In terms of timing, the low level of the compensation signal INIT corresponds to the high level of the control signal EM2, and is synchronized with the signal during the high level period of the control signal EM2, and a low level width W1 of the compensation signal INIT is smaller than a high level width W2 of the control signal EM2. In addition, in order to compensate before the light emitting element 210 emits light, the minimum width of the high level of the control signal EM2 is set to be greater than the width of the low level of the compensation signal INIT.

In addition to adjusting the ratio of the pulse width of the control signal EM according to the refresh rate of the display panel 120, the control circuit 110 may also adjust the ratio of the pulse width of the control signal EM according to the brightness of the display panel 120.

Figure 6:
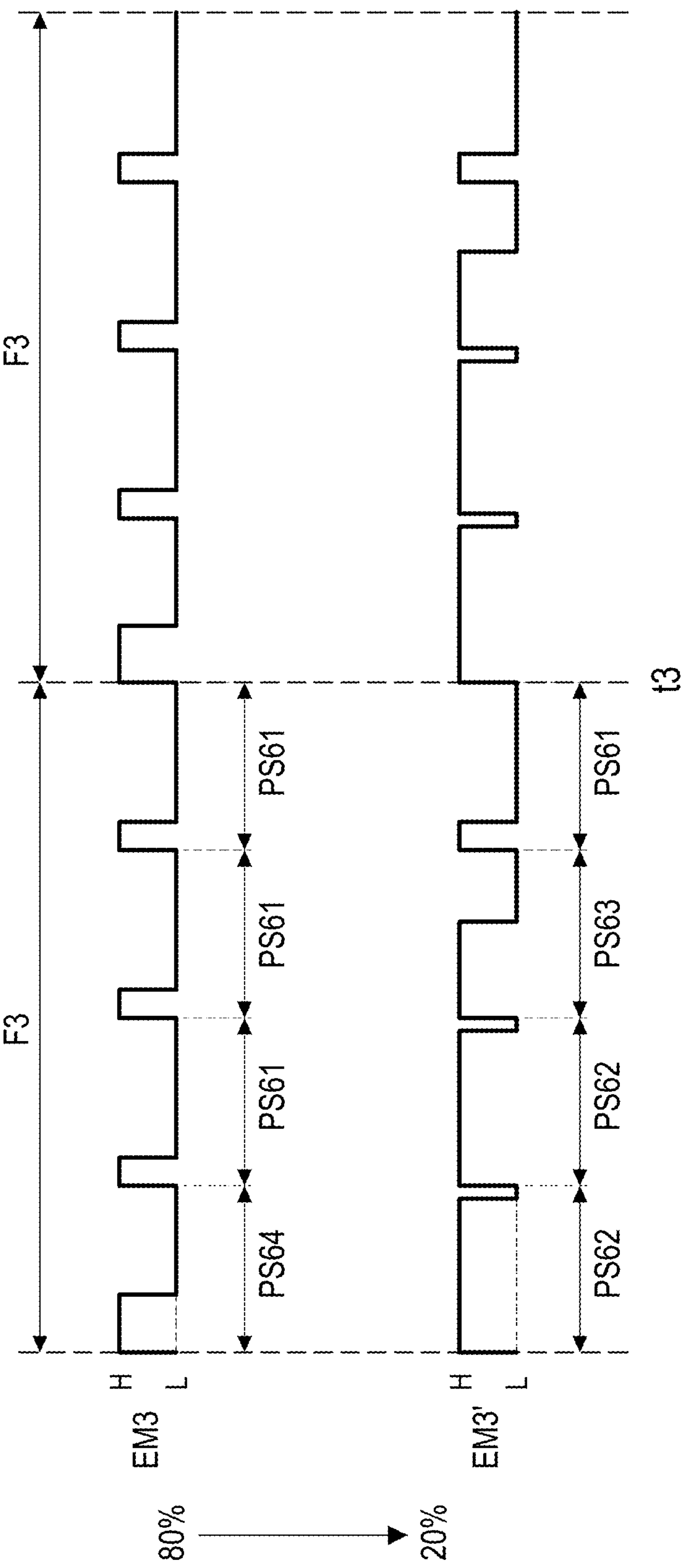
FIG. 6 is a schematic waveform diagram of the control signal according to an embodiment of the disclosure.

Specifically, FIG. 6 is a schematic waveform diagram of a control signal EM3 according to an embodiment of the disclosure. Please refer to FIG. 6. In FIG. 6, the duty cycle of the control signal EM3 in each frame period F3 is reduced from 80% to 20%. That is, the brightness of the display panel 120 becomes darker. In this embodiment, as the brightness of the display panel 120 becomes darker, the control circuit 110 adjusts the width of the low level L of multiple pulses to be smaller.

Specifically, taking one of the frame periods F3 as an example, the control signal EM3 with 80% duty cycle includes pulses PS64 and PS61. The pulse PS64 is the first pulse of the control signal EM3 in the frame period F3. The pulses PS61 are multiple pulses that are consecutively arranged after the pulse PS64 within the same frame period F3.

A control signal EM3' with 20% duty cycle includes pulses PS62 (second pulses), a pulse PS63 (third pulse), and a pulse PS61 (first pulse). The pulse PS61 is the last pulse of the control signal EM3' in the frame period F3. The pulses PS62 are consecutively arranged before the pulses PS61 and PS63. The pulse PS63 is between the pulse PS62 and the pulse PS61.

When the duty cycle of the control signal EM3 changes, the control circuit 110 adjusts the level width ratio of each pulse. For example, the control circuit 110 increases the high level width of the first few pulses PS64 and PS61 of each frame and adjusts to the pulses PS62 and PS63. Correspondingly, the low level widths of the pulses PS64 and PS61 are reduced. The level width ratio of the last pulse PS61 remains unchanged.

Therefore, as shown in FIG. 6, the low level width of the pulse PS61 is greater than the high level width of pulse PS61. The low level width of the pulse PS62 is smaller than the high level width of pulse PS62. The low level width of the pulse PS61 is greater than the low level width of the pulse PS62. The high level width of the pulse PS61 is smaller than the high level width of the pulse PS62. The low level width of pulse PS63 is smaller than the high level width of the pulse PS63. The low level width of the pulse PS61 is greater than the low level width of the pulse PS63, and the high level width of the pulse PS61 is smaller than the high level width of the pulse PS63. The low level width of the pulse PS62 is smaller than the low level width of the pulse PS63, and the high level width of the pulse PS62 is greater than the high level width of the pulse PS63. Therefore, in each frame period of the control signal EM3', the high level width of the pulse becomes smaller, and the low level width becomes greater.

In this way, a time point t3 at the end of each frame has a higher probability of occurring at a pulse with a smaller high level width, which can reduce the flicker of the display panel 120. The above-mentioned adjustment method of pulse width is merely an example and is not intended to limit the disclosure.

It may be known from the foregoing specific implementations that in order to avoid poor visual effects for the user when switching between consecutive frames of images, the light emitting time of the light emitting element (such as OLED) is concentrated as much as possible at the start time of each frame within a frame period. In order to prevent the light emitting time of the light emitting element from being overly concentrated, the light emitting time of the light emitting element is dispersed into different light emitting intervals within a frame period, as mentioned above, within a frame period, the control signal (such as EM3') has multiple pulse signals.

Figure 7:
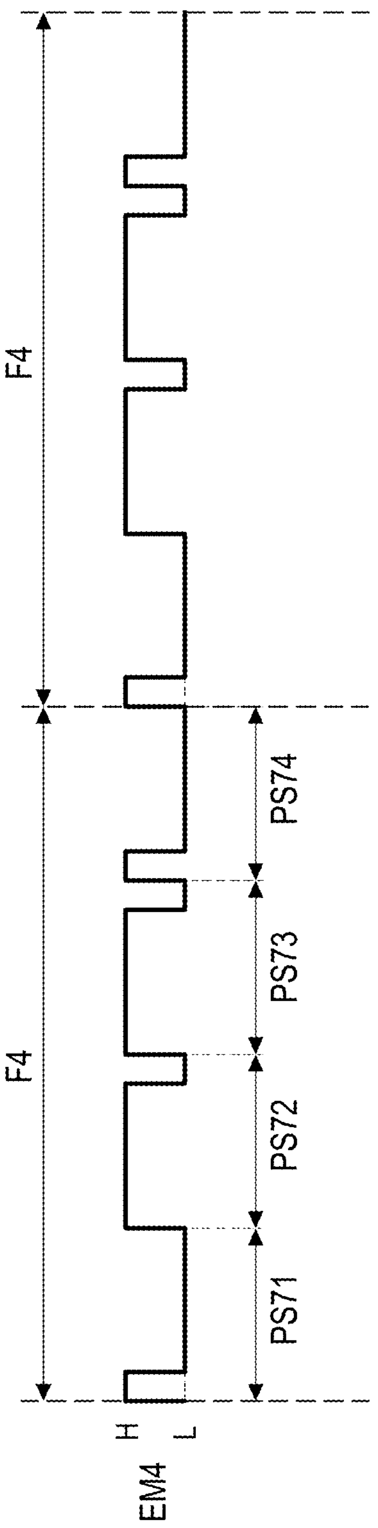
FIG. 7 is a schematic waveform diagram of the control signal according to another embodiment of the disclosure.

In order to further enhance the visual experience, the light emitting element is also maintained in a light emitting state at the frame switching time point. In another implementation, the light emitting element maintains the light emitting state at the start and end of each frame, but the light emitting time is concentrated at the start of each frame as much as possible. In another implementation, the light emitting time of the light emitting element is concentrated at the start and end of each frame. Taking OLED as an example, when the EM signal is at a low voltage level, the OLED element emits light, and in each frame period, multiple EM pulse signals are used to control whether the OLED element emits light or not. These EM pulse signals have a high duty cycle (the low voltage level time of the EM pulse signal is longer than the high voltage level time) at the start and end of each frame, but the EM pulse signal in the middle of each frame has a low duty cycle (the low voltage level time of the EM pulse signal is shorter than the high voltage level time). For example, as shown in FIG. 7, within the period of one frame F4, the control signal EM4 includes four consecutive pulses PS71 to PS74, in which the working cycles of the first pulse PS71 and the fourth pulse PS74 are higher than the second pulse PS72 and the third pulse PS73. The duty cycles of the first pulse PS71 and the fourth pulse PS74 may be equal or unequal, and the duty cycles of the second pulse PS72 and the third pulse PS73 may be equal or unequal.

In summary, in the embodiments of the disclosure, the control circuit may adjust the width ratio of the pulse high and low levels of the control signal according to the refresh rate or brightness of the display panel to reduce the flicker of the display panel. In addition, the control circuit may further provide the compensation signal to reset an end of the light emitting element so that the voltage at the end can be maintained at the same level when the current flows through the light emitting element.

Although the disclosure has been disclosed above through embodiments, the embodiments are not intended to limit the disclosure. Persons with ordinary knowledge in the relevant technical field may make some changes and modifications without departing from the spirit and scope of the disclosure. Therefore, the protection scope of the disclosure shall be determined by the appended claims.

What is claimed is:

1. A display device, comprising:

a display panel comprising a plurality of pixel driving circuits, wherein each of the plurality of pixel driving circuits comprises a light emitting element and a switching element, and the switching element controls a driving current flowing through the light emitting element; and a control circuit coupled to the display panel, and providing a control signal for controlling the switching element, wherein the control signal comprises a plurality of pulses during each frame period, and the control circuit adjusts a width ratio of a first level and a second level of the plurality of pulses according to at least one of a refresh rate and a brightness of the display panel, wherein the control circuit further provides a compensation signal to a first terminal of the light emitting element, and a width of a second level of the compensation signal is smaller than a width of the first level of the control signal.

2. The display device as claimed in claim 1, wherein as the refresh rate of the display panel becomes higher, the control circuit adjusts a width of the second level of the plurality of pulses to be greater.

3. The display device as claimed in claim 2, wherein the plurality of pulses comprise at least one first pulse, and a width of the second level of the first pulse is greater than a width of the first level of the first pulse.

4. The display device as claimed in claim 3, wherein the plurality of pulses further comprise at least one second pulse, and a width of the second level of the second pulse is greater than a width of the first level of the second pulse.

5. The display device as claimed in claim 4, wherein the width of the second level of the first pulse is greater than the width of the second level of the second pulse.

6. The display device as claimed in claim 4, wherein the second pulse is the first pulse of one frame period of the control signal.

7. The display device as claimed in claim 6, wherein the plurality of pulses comprise a plurality of first pulses, and in the frame period, the plurality of first pulses are consecutively arranged after the second pulse.

8. The display device as claimed in claim 1, wherein as the brightness of the display panel becomes darker, the control circuit adjusts a width of the second level of the plurality of pulses to be smaller.

9. The display device as claimed in claim 8, wherein the plurality of pulses comprise at least one first pulse, and a width of the second level of the first pulse is greater than a width of the first level of the first pulse.

10. The display device as claimed in claim 9, wherein the plurality of pulses further comprise at least one second pulse, and a width of the second level of the second pulse is smaller than a width of the first level of the second pulse.

11. The display device as claimed in claim 10, wherein the width of the second level of the first pulse is greater than the width of the second level of the second pulse.

12. The display device as claimed in claim 10, wherein the plurality of pulses further comprise at least one third pulse, and a width of the second level of the third pulse is smaller than a width of the first level of the third pulse.

13. The display device as claimed in claim 12, wherein the width of the second level of the first pulse is greater than the width of the second level of the third pulse.

14. The display device as claimed in claim 12, wherein the width of the second level of the second pulse is smaller than the width of the second level of the third pulse, and the width of the first level of the second pulse is greater than the width of the first level of the third pulse.

15. The display device as claimed in claim 10, wherein in one frame period of the control signal, the third pulse is between the second pulse and the first pulse.

16. The display device as claimed in claim 9, wherein the first pulse is a last pulse of the control signal in one frame period.

17. The display device as claimed in claim 16, wherein the plurality of pulses comprise a plurality of second pulses, and in the frame period, the plurality of second pulses are consecutively arranged before the first pulse.

18. The display device as claimed in claim 1, wherein a minimum width of the first level of the control signal is greater than the width of the second level of the compensation signal.

19. The display device as claimed in claim 1, wherein the second level of the compensation signal corresponds to the first level of the control signal in terms of timing.

20. The display device as claimed in claim 1, wherein the switching element and the light emitting element are coupled in series between a first voltage and a second voltage, the first terminal of the light emitting element is coupled to the switching element, and a second terminal of the light emitting element is coupled to the second voltage.

* * * * *